(12) United States Patent
Carr et al.

(10) Patent No.: US 7,854,952 B2
(45) Date of Patent: Dec. 21, 2010

(54) PROCESS FOR PREPARING CONCENTRATED MILK PROTEIN INGREDIENT AND PROCESSED CHEESE MADE THEREFROM

(75) Inventors: Alistair James Carr, Palmerston North (NZ); Christina June Coker, Palmerston North (NZ); Brian Ashley Kells, Palmerston North (NZ); Peter Dudley Elston, Palmerston North (NZ); Lilian de Barros Ferreira, Palmerston North (NZ)

(73) Assignee: Fonterra Co-Operative Group Limited, Auckland (NZ)

( * ) Notice: Subject to any disclaimer, the term of this patent is extended or adjusted under 35 U.S.C. 154(b) by 895 days.

(21) Appl. No.: 10/564,125

(22) PCT Filed: Jul. 21, 2004

(86) PCT No.: PCT/NZ2004/000154

§ 371 (c)(1),
(2), (4) Date: Aug. 21, 2006

(87) PCT Pub. No.: WO2005/009138

PCT Pub. Date: Feb. 3, 2005

(65) Prior Publication Data

US 2007/0082086 A1 Apr. 12, 2007

(30) Foreign Application Priority Data

Jul. 24, 2003 (NZ) ........................................ 527159

(51) Int. Cl.
*A23C 9/00* (2006.01)
*A23C 19/00* (2006.01)

(52) U.S. Cl. .................. 426/582; 426/580; 426/34; 426/36; 426/42

(58) Field of Classification Search ................. 426/34, 426/36, 42, 55, 56, 490, 491, 580, 582, 587
See application file for complete search history.

(56) References Cited

U.S. PATENT DOCUMENTS

| 4,202,907 A | 5/1980 | Poarch |
| 2003/0096036 A1 | 5/2003 | Bhaskar et al. |
| 2007/0059399 A1 * | 3/2007 | Wiles et al. ................... 426/36 |

FOREIGN PATENT DOCUMENTS

| EP | 0174847 A2 | 3/1986 |
| EP | 0 435 573 A1 | 7/1991 |
| FR | 2452879 | 10/1980 |
| WO | WO 82/01806 | 6/1982 |

OTHER PUBLICATIONS

Udabage et al., "Effects of Mineral Salts and Calicum Chelating Agents o the Gelation of Renneted Skim Milk", Journal of Dairy Science, 2001, pp. 1569-1575, vol. 84, No. 7, Australia.
Supplementary European Report dated Jun. 15, 2007, corresponding to European Patent Application No. 04748849, 2 pages.

* cited by examiner

*Primary Examiner*—Leslie Wong
(74) *Attorney, Agent, or Firm*—Knobbe Martens Olson & Bear LLP

(57) ABSTRACT

Process for preparing a concentrated milk protein ingredient comprising the steps of: providing a membrane retentate solution having kappa-casein milk protein, adjusting the divalent ion content of said protein solution to a predetermined level at which no gel is formed after treatment with milk clotting enzyme, adding a food grade milk clotting enzyme under conditions where kappa-casein is converted to para-kappa casein while remaining in solution, terminating the conversion by removal or inactivation of the enzyme and concentrating said solution. The resultant milk protein concentrate ingredient is used in the production of cheese.

26 Claims, 1 Drawing Sheet

PROCESS FOR PREPARING CONCENTRATED MILK PROTEIN INGREDIENT AND PROCESSED CHEESE MADE THEREFROM

REFERENCE TO RELATED APPLICATIONS

The present application is the U.S. National Phase of International Application PCT/NZ/2004/000154, filed Jul. 21, 2004 and claims priority to New Zealand Patent Application No. 527159, filed Jul. 24, 2003.

TECHNICAL FIELD

This invention relates to a process for preparing a concentrated milk protein ingredient useful in cheese making. It also relates to the use of such an ingredient to prepare a cheese-like gel and as an ingredient in making cheese and processed cheese.

BACKGROUND ART

Many processes are known which produce cheese and cheese-like products using recombining techniques without the release of whey or excess liquid. Products made by such a process are known as fully recombined. A wide variety of concentrated milk proteins are used as ingredients in recombined cheese making. Ultrafiltered milk (retentate), milk protein concentrate (MPC) and retentate powders are ingredients used in the manufacture of cheese and recombined cheese. A feature of the dry ingredients used to prepare fully recombined cheese is that the ingredients can be difficult to incorporate water into and to provide a stable emulsion with fat. Rennet treated milk protein is known to influence the texture of the cheese product and the ability to incorporate fat into the protein-water emulsion.

One of the traditional methods of producing cheese is the use of milk clotting enzymes to produce a gel. Chymosin (rennet) is typically used as the enzyme of choice. The action of rennet on cheese milk is complex. Briefly, proteolytic enzymes such as rennet modify kappa-casein to produce para-kappa-casein. A gel or curd is able to form by heating the enzyme treated milk to temperatures above about 20° C. Enzyme treated milk at almost any practical concentration has suffered from the disadvantage of being difficult to concentrate efficiently without the formation of a gel that impairs the concentration process.

A major technical barrier to solving the enzyme gelation problem during concentration is that to be able to form the desired final product, the gelation property must be able to be finally induced or restored i.e. a way needs to be found that enables the gelation property to be switched off during preparation of the ingredient and then able to be restored as and when required when used in cheesemaking.

It is known to those skilled in the art of cheese making that the properties of the gel formed by the action of enzymes are influenced by the concentration of calcium ions in the milk. Consequently, calcium chloride is a permitted additive in the preparation of natural cheese and is used in circumstances when curd gel strength would otherwise be inadequate.

It is also known that in milk, the calcium is partitioned between a soluble form in the serum phase and an insoluble form (as complex casein phosphate compounds) in the micelles (Singh and Fox, 1987). Equilibrium exists between the two. Ultrafiltration combined with diafiltration is able to remove significant amounts of soluble calcium from milk. Methods are known to enhance the removal of soluble calcium during membrane concentration by the acidification of the milk or retentate prior to, or during treatment, or by the addition of salt, or by the addition of calcium chelating agents such as citrate (Bastian, Collinge and Ernstrom, 1991). There is a practical and economic limit to the use of these agents if the requirement is to fully suppress gelation upon the addition of rennet. The value, or the disposal cost, of the diafiltration permeate becomes increasingly uneconomic as the extent of diafiltration increases, and especially when contaminated with agents that are added to promote the removal of calcium.

It is known that when solutions of sodium caseinate are treated with rennet, no gel forms. However, a gel is able to be formed upon the addition of calcium and the application of heat (Varnam & Sutherland, 1994). Treatment of skim milk with a calcium sequestering agent such as citrate or EDTA sufficient to remove at least 33% of the colloidal calcium phosphate removes the ability of rennet to cause the skim milk to form a gel. However, a gel can be subsequently induced by the incorporation of calcium salts (Udabage, McKinnon and Augustin, 2001).

Poarch (U.S. Pat. No. 4,202,907) discloses a process that takes advantage of these phenomena. The means to suppress gel formation in renneted milk protein solutions is achieved by the removal of calcium. Incorporation of calcium at some later stage restores the gelation characteristic of the rennet treated milk protein. Poarch produced a renneted sodium caseinate that was dried without gelation as an ingredient for subsequent use. The ingredient was mixed with water, a soluble calcium salt and comminuted meat (sausage batter). Upon heating, a gel formed that retains fat and moisture in sausages and other formed meat products during the cooking process.

It would be desirable to form a dried cheese ingredient which does not gel after the addition of a milk clotting enzyme, which is capable of being dried efficiently and which can be reconstituted to form a gel by the addition of water with heating, with or without adding calcium ions.

It is an object of this invention to go someway towards achieving this desideratum or at least to offer the public a useful choice.

DISCLOSURE OF THE INVENTION

In one aspect the invention is a process for preparing a concentrated milk protein ingredient which comprises the steps of:

providing a solution having a kappa-casein containing milk protein which is a membrane filtration retentate, adjusting the divalent ion content of a said protein solution to a predetermined level at which no substantial gel is formed after treatment with a milk clotting enzyme, adding a food grade milk clotting enzyme under reaction conditions appropriate to convert said kappa-casein to para kappa-casein while maintaining a solution, deactivating or removing said enzyme to terminate said conversion, and concentrating said solution.

In one embodiment other proteins are added to or are present in said milk protein solution.

Preferably said other proteins are added to said milk protein solution prior to adjusting said divalent ion content.

Preferably said divalent ion is the calcium ion.

Preferably said divalent ion content is adjusted by cation exchange using a food grade cation exchanger.

Alternatively said divalent ion content is adjusted by the addition of a food grade source of a monovalent cation.

Preferably said monovalent cation is potassium, sodium or hydrogen.

Preferably said food grade enzyme is rennet.

In one embodiment said divalent ion content is reduced by at least 25% from that in skim milk.

In another embodiment said divalent ion content is reduced by at least 30, 40, 50, 60, 70, 80, 90 or 100% from that in skim milk.

Preferably said kappa-casein is converted to para kappa-casein at a pH in the range 4.5 to 7.5 at a temperature in the range 0 to 70° C.

In another embodiment the conversion is at a temperature of 10, 20, 30, 40, 50 or 60° C.

In one embodiment fat or edible oil is added to said milk protein solution.

In one embodiment said fat is cream.

In another embodiment said fat is milk fat.

In another embodiment said milk is whole milk.

In one embodiment said process is a batch method.

In another embodiment said process is a continuous method.

In a further embodiment said process is a combination of a batch and a continuous process.

In one embodiment the process includes the additional step of heating said concentrated solution to form a processed cheese.

In another embodiment the process includes the step of combining said concentrated solution with cheese making ingredients prior to or during said heating step.

In another embodiment the process includes the additional step of drying said concentrated milk protein solution.

The process may further include the additional step of rehydrating said dried solution with hot water and blending to form a cheese.

In one embodiment said water is heated before blending.

In an alternative embodiment said water is heated during or after blending.

In one embodiment said water is heated to between 30° C. and 100° C.

In one embodiment said rehydrating water contains calcium.

The invention also consists in an ingredient prepared by the process defined above.

Another embodiment of the invention is a cheese prepared from an ingredient defined above.

In one embodiment the cheese is a processed cheese.

In another embodiment the processed cheese is a cheese spread.

In another embodiment the process of the invention includes the preliminary step of subjecting a milk to membrane filtration and recovering the milk protein retentate thereby formed.

In one embodiment said membrane filtration is ultrafiltration.

In another embodiment said ultrafiltration includes diafiltration.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The invention consists in the foregoing and also envisages embodiments of which the following gives examples only.

BRIEF DESCRIPTION OF THE DRAWINGS

The invention may be more fully understood by having reference to the accompanying FIG. 1 which is a schematic flow diagram of a preferred embodiment of the invention which includes a number of optional steps.

MODES OF CARRYING OUT THE INVENTION

Figure 1:
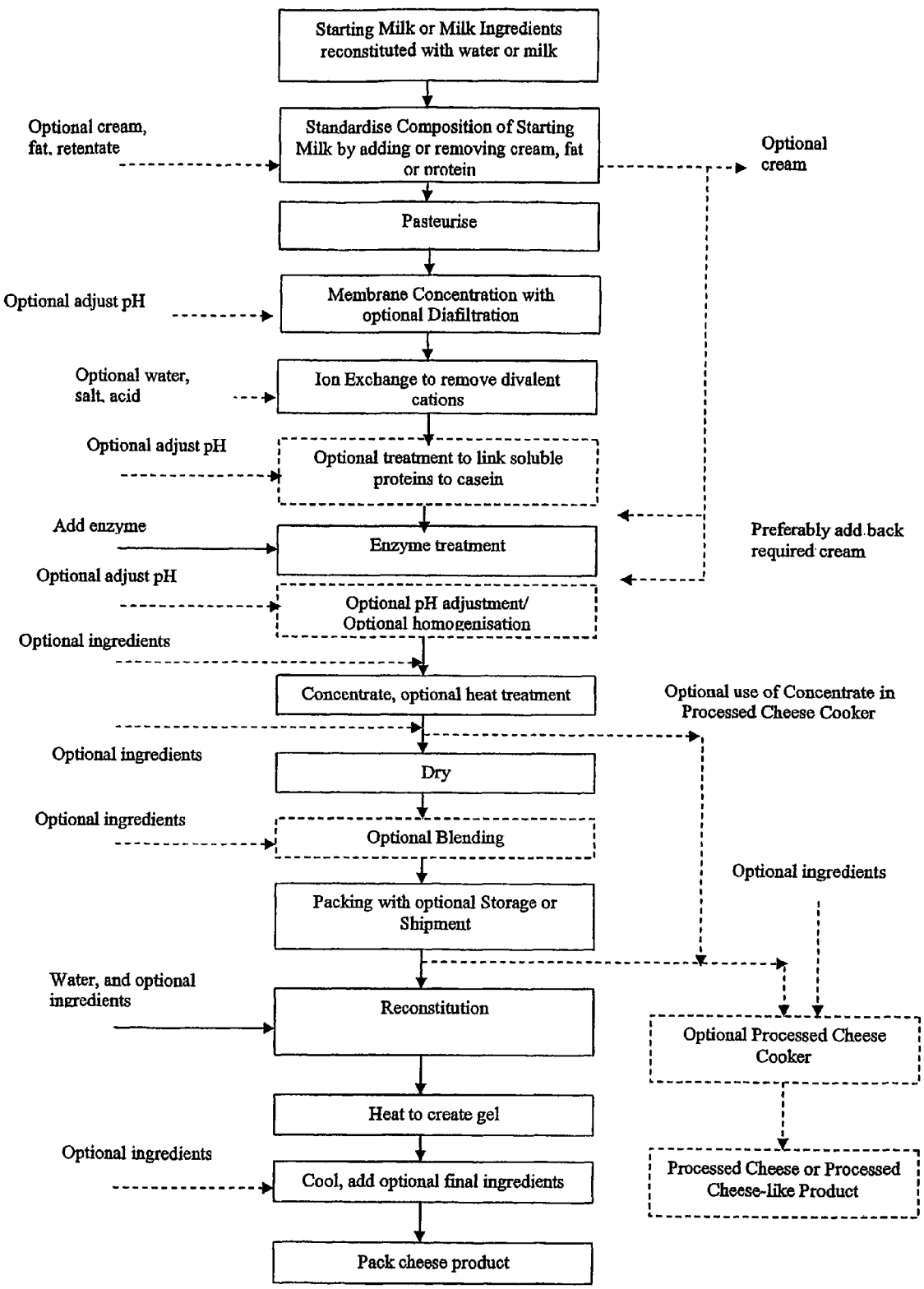

Description of Process Shown in FIG. 1

Milk, either skim or whole, may be sourced from fresh supplies or reconstituted from skim, buttermilk or whole milk powders, including retentate powders, or combinations thereof with a potable solvent. Preferred potable solvents are water and milk. Buttermilk may be used in substitution for a proportion of the starting milk.

The fat content of the milk may be adjusted by methods known in the art involving the incorporation or extraction of cream or fat. Non-dairy fat or vegetable oil may be added. Homogenisation may be used to disperse such fat or oil additions. Optionally, the starting milk may be fortified with milk retentate or whey retentate.

The prepared milk may be pasteurised. Pasteurisation is known in the art.

The milk is concentrated by membrane concentration techniques to produce a retentate. Preferably, diafiltration is used in conjunction with ultrafiltration to enhance the protein concentration relative to the lactose and minerals concentrations. Ultrafiltration and diafiltration are methods known in the art. The conduct of the ultrafiltration or diafiltration may be optionally manipulated by the addition of food grade acid or common salt.

In a preferred embodiment, the final retentate has a protein to solids not fat ratio of between 42% and 95%.

The term "milk protein solution" as used herein includes milk protein suspensions.

Optionally, pre, or post ultrafiltration, the casein and soluble proteins may be treated to control or modify their concentrations. Preferably, ion exchange, chromatography, pH and temperature treatments may be used to remove or deplete selected proteins or protein fractions. Optionally, proteins may be added. Such proteins may be either dairy or non-dairy.

Optionally, pre, or post ultrafiltration, the casein and soluble proteins may be treated to control or modify their interactions. In a preferred embodiment, the soluble proteins may become partially or fully attached or chemically linked to the casein. Such treatments may involve thermal, chemical (including pH), physio-chemical (including pressure) or enzymatic modifications.

Either prior to, or following the production of the retentate, ion exchange may be used to selectively remove divalent cations such as calcium and magnesium and replace these ions with monovalent cations such as sodium, potassium or hydrogen, or combinations thereof. In typical bovine milk, the calcium concentration is about 30 mM, which represents about 85% of the total divalent cation content. Treatment conditions according to this invention that alter the calcium content also effect corresponding changes to all the divalent cations present.

Sufficient of the divalent cations are removed to prevent the formation of a curd, coagulum or gel upon the addition of rennet or similar food grade enzymes capable of transforming kappa-casein to para-kappa-casein, or agents causing casein solutions to gel in the presence of divalent cations. Preferably ion exchange is used to remove the desired amount of divalent cations. Optionally the final desired level of divalent cations may be achieved by blending proportions of treated and untreated streams.

Following the adjustment of the divalent cation concentration, chymosin (rennet) or a similar food grade enzyme capable of converting kappa-casein to para-kappa-casein is added. The renneted solution may be held for a period to allow the enzyme to react with the kappa-casein. Optionally, this reaction may be facilitated by the application of heat to the solution. Optionally, the extent of the kappa-casein conversion reaction may be terminated at a selected extent of conversion. A preferred method for terminating the reaction is the use of heat to deactivate the enzyme. A gel does not form at the completion of the reaction period.

As used herein the expression "milk clotting enzyme" refers to an enzyme which is capable of converting kappa-casein to para-kappa-casein.

Optionally, protein behaviour may be modified by the addition of mono-cationic salts of citrate and/or phosphate. Heat may be applied in conjunction with the use of these salts.

Optionally, agents used to modify the proteins may be applied to a portion of the process stream. The untreated portion is subsequently blended with the treated portion.

The solution pH may be adjusted, before or after any treatment that modifies the proteins, by the addition of agents that act as acids or bases. Optionally the solution is cycled in pH between an alkali treatment step followed by an acid treatment step or vice versa. Preferably, a reduction in pH may be achieved by the direct addition of a permitted food grade acid or a precursor that hydrolyses in the solution to a permitted food acid. A preferred food grade acidulent is lactic acid and a preferred lactic acid precursor is glucono-delta-lactone (GDL) or lactic anhydride (lactide). A preferred base is caustic soda. Preferably, the pH adjustment agent is diluted prior to addition to the solution. The temperature may be adjusted before or after any pH adjustment.

Optionally, the process stream may be homogenised at any convenient stage during the process.

Alternatively, an acidulent may be prepared by adding an acid producing micro-organism (a starter culture) to the solution to be treated and preparing the required acid by fermenting a proportion of the lactose present. Such starter cultures are known in the art of cheese making.

Optionally, a combination of fermentation and direct acid addition may be used to attain the required acidification.

The treated solution, or fermentate, adjusted to its desired final pH is concentrated, preferably using thermal evaporation. It is an important attribute of the invention that gelation (i.e. curd formation as understood in the art of cheese making) does not occur during the said concentration step.

Optionally, the concentrate may be used directly as an ingredient in a processed cheese cooker or used as an ingredient in the preparation of cheese or processed cheese and processed cheese-like products.

Alternatively, following concentration, the concentrate is dried to a moisture content that gives a shelf-stable product at ambient temperature. A preferred moisture content in the dried powder is less than 15%. The preferred drying method is spray drying.

Optionally, at any stage prior to spray drying, the solution may be heat-treated to denature the proteins. A preferred heat treatment range is between 60 and 140° C. for between 5 seconds and 1 hour.

In one aspect, pasteurised cream, milk fat, or non-dairy fat or vegetable oil may be added to adjust the fat-in-dry matter content of the product at various stages of the process prior to drying. Preferably the mixture is homogenised following the addition of a source of fat or oil.

Optionally, a solution containing divalent cations may be added to the concentrate prior to drying or during the drying process, such that the conditions do not result in gelation of the ingredient during drying.

Alternatively, a powdered salt containing divalent cations may be added to the powder during or following drying. Optionally, fat, cream, acidulents or flavourings in powdered form may be blended in prior to packaging.

Where the dried powder is not used immediately, it is packaged. Preferred packages include bags or bins or packaging systems that enable stable ambient storage of the ingredient for up to and including two years.

The powdered cheese ingredient may be converted into an edible cheese by hydrating and applying heat and mixing. Agitation may be used to facilitate the dispersion of the powder into the solution. Optional ingredients that may be added include cheese, milk fat, cream, non-dairy fat or oil, skim milk powder (SMP), whole milk powder, milk protein concentrate (MPC), caseinate, total milk protein (TMP™), whey protein concentrate (WPC), vegetable protein, hydrocolloid or polysaccharide, flavouring, colouring, salts of citric and phosphoric acids and food approved acids.

If required, the mixture may be pH adjusted. A preferred final pH of the mixture prior to being heated (cooked) is between 5.0 and 8.0. If desired, prior to cooking, starter culture may be added and acid allowed to develop by fermentation. Alternatively, acid may be added directly. Preferred acidulents are lactic acid, glucono-delta-lactone (GDL), lactic anhydride (lactide), citric acid, acetic acid and phosphoric acid. If required, base may be added to attain the cooking pH.

The mixture is cooked by the introduction of heat. A preferred temperature for the formation of a gel is at least 30° C. A more preferred temperature is at least 72° C. The preferred treatment time is inversely related to the treatment temperature and is between 30 seconds and one hour.

Optionally, a calcium salt may be added prior to heating the mixture.

Optionally, part way through the cooking period, the pH may be adjusted to between 5.0 and 8.0.

Optionally, the gelled mixture may be cooled. During or after cooling, heat sensitive ingredients from the aforementioned list may be added. Preferred methods of cooling are scraped surface heat exchanger, water jacket cooling or vacuum flash cooling.

Optionally, the cheese product may be subjected to shear prior to packaging.

Optionally, flavour precursors may be added before cooking, post cooking or prior to packaging. Such flavour precursors may include viable organisms or enzymes that develop flavours over time in the packaged product.

The cooked mixture is packed. The packaged goods may be further cooled in storage. The storage conditions may be maintained to allow ripening and flavour development to occur in the product. Flavour development and ripening are processes known in the art of cheese making.

The cheese product is preferably packaged and held in chilled storage prior to final use.

In an alternative embodiment, the dried cheese ingredient is placed in a processed cheese cooker and used as an ingredient in the preparation of processed cheese and processed cheese-like products.

In another aspect, the dried cheese ingredient may be used in the formulation of confectionery products, nutrition bars and the like. The unique combination of high protein content, with enhanced emulsifying and hydration properties can be used to advantage in such products where there is often limited quantities of water for solvation.

Specific examples of prepared embodiment of the invention below.

EXAMPLES OF THE INVENTION

Example 1

Manufacture of High Fat Low Calcium and Renneted Ingredient

Three 25 kg bags of commercial milk protein concentrate (MPC85, ALAPRO™ 4850) were reconstituted in 50° C. water to 9% total solids. The reconstituted solution was cooled to 10° C. The cooled solution was then pH adjusted to 5.85 with 3% lactic acid solution.

Ion Exchange

The cooled pH adjusted MPC85 solution was passed through a column containing 100 L of RHOM & HAAS ion exchange resin SR1LNa to reduce the calcium concentration. Following at least 90% calcium removal, 196 kg of (40% fat) cream was added to the ion-exchanged MPC85 solution. The calcium to protein ratio of the mixture was 3,320 mg/kg (1300 mg/kg powder basis of Table 1). This corresponds to a removal of approximately 90% of the calcium that was present in the starting milk.

Cold Renneting

The mixture was renneted cold. Australian Double Strength rennet was added at a rennet to protein ratio of 0.25% to the calcium depleted, cream fortified MPC85 and held at 10° C. for 12 hours for the reaction to proceed.

Drying

The renneted mixture was evaporated (50-55° C.) to about 40% total solids, homogenised and then spray dried.

Example 2

Efficacy of Renneting (Comparative)

Renneted solution (from example 1) was heated to 50° C. and held for 1 hour to ensure that the reaction had gone to completion. No sign of precipitation or formation of a gel was observed. To a second sample, calcium chloride solution was added in sufficient quantity to precipitate the protein. On heating the precipitate in hot water (50° C.) the precipitate firmed to a stretchy mozzarella type consistency indicating that the ion exchanged retentate had undergone sufficient renneting (in the process of example 1) to form a cheese gel but for the absence of sufficient calcium and heat. When the same test was carried out on non-renneted ion-exchanged retentate the precipitate formed was fine, non-cohesive and did not possess a gel-like texture.

Example 3

Hot Renneting

Although milk is commonly treated with rennet as a batch process, effective renneting at temperatures elevated above those commonly used in cheese manufacture would enable a continuous process to be used for the renneting, concentration and drying stages of the desired process.

A 20% w/w solution of commercial medium calcium depleted MPC85 powder (NZMP 4861) (approximately 12,800 mg Ca/kg powder i.e. approximately 50-60% of the calcium removed) was reconstituted by mixing the powder in water with an overhead stirrer for 30 minutes at 50° C. The calcium to protein ratio of the solution was 15,100 mg/kg.

A sample of the reconstituted solution was taken and calcium chloride solution was quickly added in sufficient quantity to precipitate the protein. The precipitate was immediately washed in hot water (50° C.). After washing, the texture of the precipitate was fine, non-cohesive and did not possess a gel like structure.

To the remainder of the solution (at 50° C.), Australian Double Strength rennet was added at a rennet to protein ratio of 0.25%.

Samples were taken every 15 seconds for the first 2 minutes and then every 5 minutes for 30 minutes. To each sample, calcium chloride solution was quickly added in sufficient quantity to precipitate the protein and the precipitate was immediately washed in hot water (50° C.). The texture of all the precipitates after washing had a firm stretchy gel-like character indicating that the protein had been converted rapidly by the rennet into a state capable of forming a cheese-like coagulum but for the absence of calcium.

This demonstrated that at temperatures of 50° C. and adequate rennet concentration, the reaction with the casein was rapid and if sufficient calcium was removed, fully renneted milk protein solutions would not gel at temperatures of at least 50° C.

Example 4

Manufacture of Medium Calcium Heat Treated and Renneted Ingredient

Skim milk retentate (about 16% solids) containing 85% protein on a dry basis was sourced from the Hautapu site of Fonterra Co-Operative Group Limited. This retentate was diluted 1:1 ratio with demineralised water. Previously 120 L of SR1LNa resin was converted to the potassium form using pharmaceutical grade potassium chloride supplied by Bronson and Jacobs PTY Ltd., Auckland, New Zealand. 600 L of diluted retentate was divided into two parts of 360 L and 240 L. The 360 L batch of retentate was pH-adjusted using citric acid to a pH of about 5.9 and passed through the ion-exchange column to remove calcium and replace it with potassium. The exchanged solution had a pH of about 6.8. 120 L of ion-exchanged retentate was blended with 180 L of non-ion-exchanged retentate to produce a medium calcium retentate with a calcium to protein ratio of 16,330 mg/kg (corresponding to 13,500 mg/kg product basis in Table 1) and amounts to a removal of about 50% of the calcium in the starting milk. This retentate was heat-treated to denature the whey proteins. The heat treatment was for approximately 4 min at 120° C.

Rennet was added to the heat-treated solution and after about 30 min at approximately 50° C., the solution was evaporated to about 20% solids and spray dried to produce a powder. The solution did not form a gel during the evaporative concentration process.

Example 5

Storage of Ingredient Powder

A sample of the powdered cheese ingredient prepared as described in example 1 was placed in storage. The storage stability of the ingredient, in terms of colour and peroxide levels, at 30° C. and 40° C. was studied over 20 weeks. Differences of greater than one unit in the whiteness index are detectable by eye. The ingredient was stable with respect to colour on storage at 30° C. but was not stable when stored at 40° C. All of the peroxide values (PV) were below the threshold for sensory detection indicating that the fat in the ingredient was of good quality. This test suggests that the ingredient can be stored and shipped to markets removed in time and place from the source of milk supply and used where and when convenient in the preparation of cheese.

TABLE 1

| Composition of powders | | | |
|---|---|---|---|
| | | High fat renneted low calcium ingredient (from Example 1) | Low fat, medium calcium-depleted heat-treated and renneted ingredient (from Example 4) |
| Ash | % w/w | 3.71 | 8.18 |
| Fat | % w/w | 50.4 | Nil |
| Moisture | % w/w | 1.66 | 1.44 |
| Protein | % w/w | 39.17 | 82.6 |
| Lactose | % w/w | 4.43 | 7.7 |
| Ca | mg/kg | 1300 | 13500 |
| Mg | mg/kg | 94.4 | 580 |
| K | mg/kg | 1150 | 19000 |
| Na | mg/kg | 12300 | 382 |

Note:
Mineral concentrations are on a mg/kg product basis.

Example 6

Rehydrating and Formation of Gel

Method:
1. 330 g of high-fat low calcium renneted ingredient (of Example 1, Table 1) was placed in a food processor and 242 g of boiling water was added and agitated at high speed. Surprisingly, a good cheese-like emulsion rapidly formed without fat separation that was similar to a processed cheese melt.
2. After 1 minute, the mixture was poured into a mould and left to set. Once cooled to room temperature, the cheese-like gel was able to be sliced finely, and melted and stretched similar to Mozzarella cheese when heated.

This showed unexpectedly that a useful cheese product could be made from a low calcium renneted milk protein ingredient simply by the addition of water and heat alone.

Example 7

Comparison Product Example Using Non-Fat, Medium Calcium, Renneted Heat-Treated Ingredient Made in a Food Processor-Type Blender (without Calcium Addition)

Method:
1. 152 g non-fat, medium calcium, renneted, heat-treated ingredient (of Example 4, Table 1) and 178 g AMF were placed in a food processor and chopped until they formed a paste.
2. 242 g boiling water was added and agitated at high speed. The fat separated at this stage and an emulsion did not readily form.
3. The mixture was placed in a microwave oven for heating for 1 minute on the high power setting.
4. The mixture was returned to the food processor and agitated at high speed until emulsion was formed.
5. The mixture was poured into a mould and left to set.

Once cooled to room temperature, the cheese-like product had a crumbly texture that did not stretch when heated.

In addition to textural differences in the cheese blocks, the cheeses show distinct grilling characteristics. In comparison to the cheese made with the non-fat, medium calcium, renneted, heat-treated ingredient (Example 7), the cheese made from the high fat, low calcium, renneted ingredient (Example 6) had different melt, stretch and blister characteristics.

Examples 6 and 7 show that a range of cheese-like products with varying textures and melt characteristics can be produced without the need to add calcium at the product formation stage.

Example 8

Preparation of Processed Cheese Slice

To a low shear, twin screw Blentech CC45 mixer/cooker (Blentech Corporation, Rohnert Park, Calif.) were added ground, high solids young cheddar (4500 g), ground cheddar 40% FDM (1350 g), ground matured cheddar (800 g), salted butter (810 g), high fat renneted low calcium powder (of Example 1, Table 1) (2350 g), salt (67 g), tri-sodium citrate (334 g), disodium phosphate (83 g), water (1596 g) and sorbic acid (11 g). This mixture was blended without the application of heat at 130 rpm for 5 minutes before adding citric acid (48 g). The mixture was blended for another minute and the temperature increased to 87° C. using direct steam injection over 7 minutes. Once the target temperature was attained, the hot product was mixed for 1 minute prior to casting the molten mass into slices on a cold table. The chilled product had a composition and texture typical of processed cheese slices (pH 5.77, moisture 39.9%).

Surprisingly, the calcium depleted, renneted, fat containing ingredient (of Example 1) hydrated rapidly and was dispersed into the emulsion without the formation of lumps or undissolved particles. In contrast, conventional milk protein concentrate powders (retentate powders) when used in processed cheese melts would have been expected to display undesirable attributes of slow or poor hydration, a reluctance to disperse and a propensity to produce a product with lumps or small unincorporated particles.

Example 9

Texture of Spreads

The texture of a processed cheese spread prepared by using an ingredient of this invention was measured and compared with controls prepared using a standard MPC70 ingredient and a calcium depleted MPC70. Texture was assessed by measuring the elastic modulus, G', of a sample of the resulting product. The elastic modulus was obtained at 0.1 Hz using a texture analyser TA AR2000 rheometer (TA Instruments—Waters LLC, New Castle, USA) at 20° C. using the method described by Lee S. K. & Klostermeyer H., *Lebensm.-Wiss. U-Technol.*, 34, 288-292 (2001). (A description of elastic modulus is detailed in Ferry (Perry, J. D., (Ed.), Viscoelastic Properties of Polymers, $3^{rd}$ edn. New York. John Wiley & Sons. 1980)). Gel firmness observations were replicate determinations taken from different samples taken from the same batch of product (different pottles).

Formulation of Spread Samples

The protein concentrate powders were prepared from skim milk which did not contain added fat.

Control 1 was prepared using a standard 70% milk protein concentrate (ALAPRO 4700), Control 2 was prepared using a calcium depleted 70% milk protein concentrate, Ingredient 1 was a milk proteinate prepared according to Example 1 where the protein content was 70%, Ingredient 2 was similar to Ingredient 1 except that Ingredient 2 was given the heat treatment of Example 4.

Protein Ingredient Composition

The protein ingredients used had compositions shown in Table 2.

TABLE 2

Ingredient compositions

| Ingredient | ALAPRO 4700 | Ca-depleted MPC70 | Ingredient Sample 1 | Ingredient Sample 2 |
|---|---|---|---|---|
| Fat % | 0.96 | 1.39 | 1.26 | 1.49 |
| Protein % | 72.9 | 72.03 | 70.9 | 67.8 |
| Lactose % | 17.2 | 17.0 | 18.1 | 20.1 |
| Ash % | 7.54 | 7.55 | 7.56 | 7.28 |
| Moisture % | 3.81 | 3.82 | 4.04 | 3.65 |
| Na % | 0.21 | 0.74 | 1.31 | 1.39 |
| Ca % | 2.01 | 1.54 | 1.13 | 1.05 |

Spread samples were prepared using the formulations in Table 3.

TABLE 3

Formulations of spreads

| Ingredient | Control 1 (ALAPRO 4700) | Control 2 (Ca-depleted MPC70) | Ingredient 1 | Ingredient 2 |
|---|---|---|---|---|
| Soya oil (g) | 185.5 | 185.5 | 185.5 | 185.5 |
| Protein ingredient (g) | 85.1 | 82.5 | 83.8 | 87.7 |
| Lactose (g) | 3.2 | 5.2 | 4.2 | 0.1 |
| TSC (g) | 13.28 | 13.54 | 13.91 | 13.86 |
| CA (g) | 3.35 | 3.09 | 2.72 | 2.77 |
| Salt (g) | 6.0 | 6.0 | 6.0 | 6.0 |
| Water (g) (includes allowance of 11.0 g for evaporation) | 297.6 | 298.1 | 297.9 | 298.1 |
| Total (g) | 594.03 | 593.93 | 594.03 | 594.03 |
| Measured moisture (%) | 51.2 | | 51.1, 50.7 | 51.05, 51.1 |
| Measured pH | 5.72 | 5.72, 5.72 | 5.77, 5.76 | 5.73, 5.75 |

TSC = tri-sodium citrate
CA = citric acid

Spread Preparation

The spreads were prepared using a 2 L capacity Vorwerk Thermomix TM 21 blender cooker (Vorwerk Australia Pty. Ltd., Granville, N.S.W., Australia).

The protein ingredient e.g. MPC70 (a 70% protein (dry basis) milk protein concentrate powder (ALAPRO 4700, Fonterra Co-operative Group Limited, Auckland)) was hydrated in salt solution (13.28 g tri-sodium citrate (Jungbunzlauer GmbH, Perhofen, Austria), 3.35 g citric acid (Jungbunzlauer GmbH, Perhofen, Austria), 6.0 g sodium chloride (Pacific Salt, Christchurch, New Zealand) and 200 g water). The mixture was hydrated overnight at 4° C.

Soya oil (AMCO, Goodman Fielder, Auckland, New Zealand) was heated for 1 min at temperature set at 100 and speed set at 1 (this brought the temperature of the oil to 60° C.).

The hydrated MPC70, lactose and the remaining water (97.6 g) were added to the oil. The mixture was cooked at a temperature set at 85° C. for 7 min at speed set at 4 (2000 rpm). At the end of each minute, the speed was set to "Turbo" (12,000 rpm) for 3 s to thoroughly mix the emulsion as well as to prevent burning and sticking of the emulsion to the wall of the cooker. The hot emulsion was poured into plastic screw cap pottles, inverted, then stored at 4° C. The final pH of the spread was 5.75±0.05.

The texture of the stored emulsion was measured at 1 week of age using a texture analyser TA AR2000 (TA Instruments—Waters LLC, New Castle, USA). The conditions of the small strain oscillatory elastic modulus (G' measurement) were 20° C., 0.1 Hz and strain of 0.005.

Composition of the Emulsion

The spreads had a nominal composition of 51.0% moisture, 31.4% fat, 10.0% protein, 5.9% lactose and remainder 1.7% other.

Textures

The textures of the spreads measured as G' are shown in Table 4.

TABLE 4

Comparison of texture of spreads

| | Control 1 (ALAPRO 4700) | Control 2 (Ca-depleted MPC70) | Ingredient 1 | Ingredient 2 |
|---|---|---|---|---|
| G' (Pa) | 199, 177 | 246, 279 | 1295, 1269 | 1326, 1285 |

The ingredients of this invention gave enhanced spread textures (firmness) compared with the untreated controls.

REFERENCES

Bastian E. D., Collinge S. K. & Ernstrom C. A. (1991) "Ultrafiltration: Partitioning of milk constituents into permeate and retentate". *Journal of Dairy Science*, 74, 2423-2434.

Singh H & Fox P. F. (1987) "Heat stability of milk: influence of colloidal and soluble salts and protein modification on the pH-dependent dissociation of micellar κ-casein". *Journal of Dairy Research*, 54, 523-534.

Varnam A. H. & Sutherland J. P. "Milk and milk products". *Technology, chemistry and microbiology*. p. 175. Chapman & Hall, London.

Udabage P., McKinnon I. R. & Augustin M. A. (2001) "Effects of mineral salts and calcium chelating agents on the gelation of renneted skim milk". *Journal of Dairy Science*. 84, 1569-1575.

The invention claimed is:

1. A process for preparing a concentrated milk protein ingredient which comprises the steps of:
   providing a solution having a kappa-casein containing milk protein which is an ultrafiltration retentate;
   adjusting the divalent ion content of said protein solution to a predetermined level at which no substantial gel is formed after treatment with a milk clotting enzyme wherein said adjusting is achieved by cation exchange using a food grade cation exchanger to replace calcium and magnesium with sodium or potassium;
   adding a food grade milk clotting enzyme under reaction conditions appropriate to convert said kappa-casein to para kappa-casein while maintaining a solution;
   deactivating or removing said enzyme to terminate said conversion; and
   concentrating said solution.

2. The process of claim 1, wherein other proteins are added to or are present in said milk protein solution.

3. The process of claim 2, wherein said other proteins are added to said milk protein solution prior to adjusting said divalent ion content.

4. The process of claim 1, wherein said food grade enzyme is rennet.

5. The process of claim 1, wherein said divalent ion content is reduced by at least 25% from that in skim milk.

6. The process of claim 1, wherein said ion content is reduced by at least 30, 40, 50, 60, 70, 80, 90 or 100% from that in skim milk.

7. The process of claim 1, wherein said kappa-casein is converted to para kappa-casein at a pH in the range of 4.5 to 7.5 at a temperature in the range of 0 to 70° C.

8. The process of claim 7, wherein said conversion is at a temperature of 10, 20, 30, 40, 50 or 60° C.

9. The process of claim 1, wherein fat or edible oil is added to said milk protein solution.

10. The process of claim 9, wherein said fat is cream.

11. The process of claim 9, wherein said fat is milk fat.

12. The process of claim 1, wherein said milk protein is made from whole milk.

13. The process of claim 1, carried out as a batch process.

14. The process of claim 1, carried out as a continuous process.

15. The process of claim 1, carried out as a combination of a batch and a continuous process.

16. The process of claim 1, which includes the additional step of heating said concentrated solution to form a process cheese.

17. The process of claim 16, which includes the step of combining said concentrated solution with cheese making ingredients prior to or during said heating step.

18. The process of claim 1, which includes the additional step of drying said concentrated milk protein solution.

19. The process of claim 18 which includes the additional step of rehydrating said dried solution with hot water and blending to form a cheese.

20. The process of claim 19, wherein said water is heated before blending.

21. The process of claim 19, wherein said water is heated during or after blending.

22. The process of claim 19 wherein said water is heated to between 30° C. and 100° C.

23. The process of claim 19 wherein said rehydrating water contains calcium.

24. The process of claim 1 which includes the preliminary step of subjecting a milk to ultrafiltration and recovering the milk protein retentate thereby formed.

25. The process of claim 24 wherein said ultrafiltration includes diafiltration.

26. The process of claim 18, wherein said drying is by spray drying.

* * * * *